United States Patent
Mizuno

[11] Patent Number: 5,881,693
[45] Date of Patent: Mar. 16, 1999

[54] APPARATUS AND METHOD FOR CONTROLLING COMBUSTION IN INTERNAL COMBUSTION ENGINES

[75] Inventor: Hiroyuki Mizuno, Toyota, Japan

[73] Assignee: Toyota Jidosha Kabushiki Kaisha, Toyota, Japan

[21] Appl. No.: 991,341

[22] Filed: Dec. 16, 1997

[30] Foreign Application Priority Data

Dec. 18, 1996 [JP] Japan .................................. 8-338333

[51] Int. Cl.$^6$ .................................................. F02B 17/00
[52] U.S. Cl. ............................ 123/295; 123/435; 123/436
[58] Field of Search ................................. 123/295, 493, 123/492, 435, 436

[56] References Cited

U.S. PATENT DOCUMENTS

| | | | |
|---|---|---|---|
| 5,170,759 | 12/1992 | Ito | 123/305 |
| 5,331,933 | 7/1994 | Matsushita | 123/295 |
| 5,722,362 | 3/1998 | Takano et al. | 123/295 |
| 5,722,363 | 3/1998 | Iida et al. | 123/305 |
| 5,755,198 | 5/1998 | Grob et al. | 123/295 |

FOREIGN PATENT DOCUMENTS 8-4568  1/1996  Japan .

Primary Examiner—Erick R. Solis
Attorney, Agent, or Firm—Oliff & Berridge, PLC

[57] ABSTRACT

An internal combustion engine and method of engine control that selectively shifts the combustion mode carried out in its cylinder between stratified charge combustion and homogeneous charge combustion. A fuel supply device supplies the cylinder with fuel. A condition detecting device detects the operating conditions of the engine. A mode determining device determines the preferred combustion mode in accordance with the detected operating conditions. If the mode determining device determines that homogeneous charge combustion is to be performed, a first controller sets a first fuel supply amount and controls the fuel supplying device accordingly so that the engine torque fluctuation approaches a predetermined target value. If the determining device determines that stratified charge combustion is to be performed, a second controller sets a second fuel supply amount and controls the fuel supplying device accordingly so that the engine torque fluctuation approaches a predetermined target value. This permits smooth fuel control and prevents torque shocks.

20 Claims, 7 Drawing Sheets

APPARATUS AND METHOD FOR CONTROLLING COMBUSTION IN INTERNAL COMBUSTION ENGINES

BACKGROUND OF THE INVENTION

The present invention relates to an apparatus and method for controlling combustion in internal combustion engines, and more particularly, to an apparatus and method for controlling combustion in an internal combustion engine that injects fuel directly into its cylinders and performs both stratifed charge combustion and homogeneous charge combustion.

In a typical automotive engine, fuel is injected into an intake port by a fuel injection valve to charge the associated combustion chamber with a homogeneous mixture of fuel and air. The air fuel ratio of the mixture is stoichiometric. An air intake passage is opened and closed by a throttle valve, which is operated in cooperation with an acceleration pedal. The opening of the throttle valve adjusts the intake air amount (and ultimately the amount of homogeneously mixed air and fuel) that is supplied to the combustion chambers of the engine. This controls engine power.

To improve fuel efficiency, lean combustion may be performed. When performing lean combustion, the air fuel ratio of the homogeneous mixture drawn into the combustion chamber is increased to a value greater than the stoichiometric air fuel ratio. The lean air fuel mixture is then swirled and burned. Japanese Unexamined Patent Publication No. 8-4568 describes an apparatus for controlling combustion in an engine that performs such lean combustion.

The apparatus first determines a basic fuel injection amount in accordance with the depression degree of the acceleration pedal. The apparatus then corrects the basic fuel injection amount to obtain an actual fuel injection amount, which is the actual amount of injected fuel, in accordance with the difference between the air fuel ratio of the mixture supplied to the engine and the maximum air fuel ratio permitted for stable combustion (lean limit). This enhances fuel efficiency while preventing uncomfortable engine torque fluctuations (power fluctuations).

However, when performing homogeneous charge combustion, the throttling action of the throttle valve drastically decreases the pressure in the intake passage regardless of whether the air fuel ratio of the mixture corresponds to the stoichiometric value or to the lean limit value. This increases energy loss due to pumping (pumping loss) and decreases efficiency. Stratified charge combustion solves this problem. In stratified charge combustion, the throttle valve is opened wide, and fuel is supplied directly into each combustion chamber. This delivers a rich, highly combustible air-fuel mixture to the vicinity of the spark plug and improves ignition.

Stratified charge combustion is performed when the engine load is small. The concentration of fuel in the vicinity of the spark plug further increases fuel efficiency, and pumping loss is reduced. When the engine load increases, the combustion mode is shifted from stratified charge combustion to lean homogeneous charge combustion. During lean homogeneous charge combustion, the fuel injected from the fuel injection valve is dispersed homogeneously in the cylinder.

In such an engine that shifts combustion modes, it is desirable that the engine torque fluctuation be as close as possible to a target value when performing stratified charge combustion just as when performing lean homogeneous charge combustion. However, when performing stratified charge combustion, a rich mixture is delivered to the vicinity of the spark plug. Thus, it is difficult to minimize the difference between the torque fluctuation and its target value just by computing the actual fuel injection amount by correcting the basic fuel injection amount in the same manner as when performing lean homogeneous charge combustion.

In the prior art, this problem is dealt with by installing an exhaust gas recirculation (EGR) mechanism, which reduces engine emissions, in the engine to minimize the difference between the torque fluctuation and the target value when performing stratified charge combustion. The EGR mechanism includes an EGR passage, which connects an engine exhaust duct with an air intake passage, and an EGR valve for opening and closing the EGR passage. If the engine load is small, the EGR valve is opened to recirculate the exhaust gas. This enhances the reduction of NOx.

When the torque fluctuation is greater than the target value, the EGR amount is reduced to decrease the torque fluctuation to a value lower than the target value. When the torque fluctuation is smaller than the target value, the EGR amount is increased to minimize the difference between the torque fluctuation and the target value. Thus, the increase or decrease of the EGR amount during stratified charge combustion minimizes the difference between the engine torque fluctuation and the target value. The correction of the basic fuel injection amount is not carried out when performing stratified charge combustion. The basic fuel injection amount, which is obtained in accordance with the depression degree of the acceleration pedal, is directly used as the actual fuel injection amount.

Figure 10:
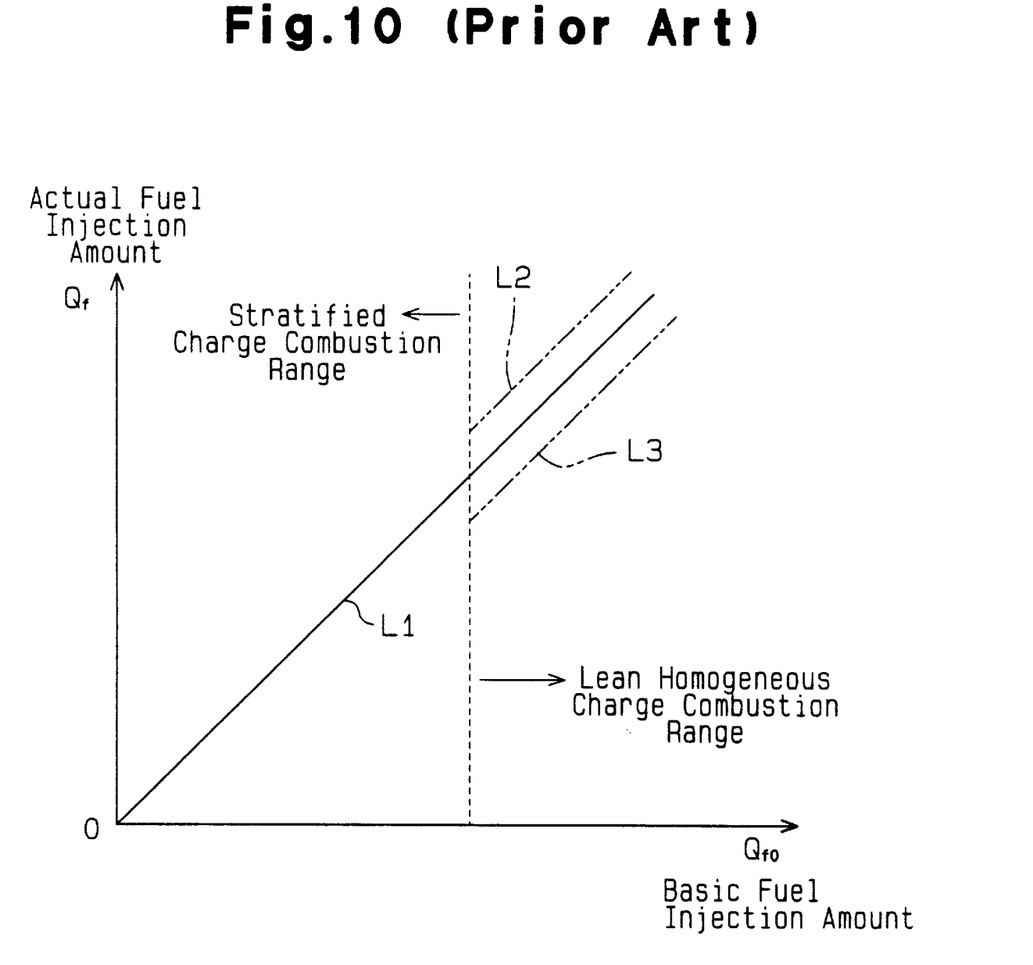
FIG. 10 is a graph showing the relationship between the basic fuel injection amount and the actual fuel injection amount in a prior art combustion control apparatus.

More specifically, as shown in FIG. 10, if the engine load (which is represented by the basic fuel injection amount $Q_{f0}$) is in a stratified charge combustion range, the actual fuel injection amount $Q_f$ is equal to the basic fuel injection amount $Qf_0$, which is obtained in accordance with the acceleration pedal depression degree. Thus, in the stratified charge combustion range, as the acceleration pedal depression degree changes, the actual fuel injection amount $Q_f$ and the basic fuel injection amount $Qf_0$ are directly proportional as indicated by solid line L1. When the engine load enters a lean homogeneous charge combustion range, the actual fuel injection amount $Q_f$ is obtained by correcting the basic fuel injection amount $Q_{f0}$. Thus, as the acceleration pedal depression degree changes, the actual fuel injection amount $Q_f$ and the basic fuel injection amount $Q_{f0}$ shift as indicated by dotted line L2 or L3. As apparent from the graph of FIG. 10, at the point of shifting of the combustion mode, a sudden increase or decrease occurs in the actual fuel injection amount $Q_f$. This produces a torque shock, which degrades the performance of the engine.

SUMMARY OF THE INVENTION

Accordingly, it is an objective of the present invention to provide an apparatus and method for controlling combustion in an internal combustion engine that prevents torque shocks when the actual fuel injection amount changes suddenly due to shifting of the combustion mode and thus improves engine performance.

To achieve the above objective, an internal combustion engine having a cylinder is provided in a first aspect of the present invention. The engine selectively operates in a stratified charge combustion mode and a lean homogeneous charge combustion mode to burn fuel in the cylinder. The engine includes a fuel supply device for supplying the fuel into the cylinder. An output fluctuation detector detects fluctuations in the output rotation of the engine. A determining device determines which combustion mode is being performed. A controller establishes a first fuel supply amount to cause the output fluctuation of the engine to approach a predetermined target value when the determination result indicates lean homogeneous charge combustion and to control the fuel supply device in accordance with the first fuel supply amount. The controller establishes a second fuel supply amount in accordance with the first fuel supply amount when the determination result indicates stratified charge combustion. The controller controls the fuel supply device in accordance with the second fuel supply amount.

In a second aspect of the present invention, a method for controlling delivery of fuel to a cylinder of an engine is provided. Fuel is delivered by selectively operating the engine in a stratified charge combustion mode and a lean homogeneous charge combustion mode. The method includes the steps of detecting operating conditions of the engine, selecting a combustion mode in accordance with the detected operating conditions, establishing and delivering a first fuel supply amount to cause an output fluctuation of the engine to approach a predetermined target value when homogeneous charge combustion is being performed, and establishing and delivering a second fuel supply amount in accordance with the first fuel amount when stratified charge combustion is being performed.

Other aspects and advantages of the invention will become apparent from the following description, taken in conjunction with the accompanying drawings, illustrating by way of the example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A combustion control apparatus for an automotive engine will now be described with reference to the drawings.

Figure 1:
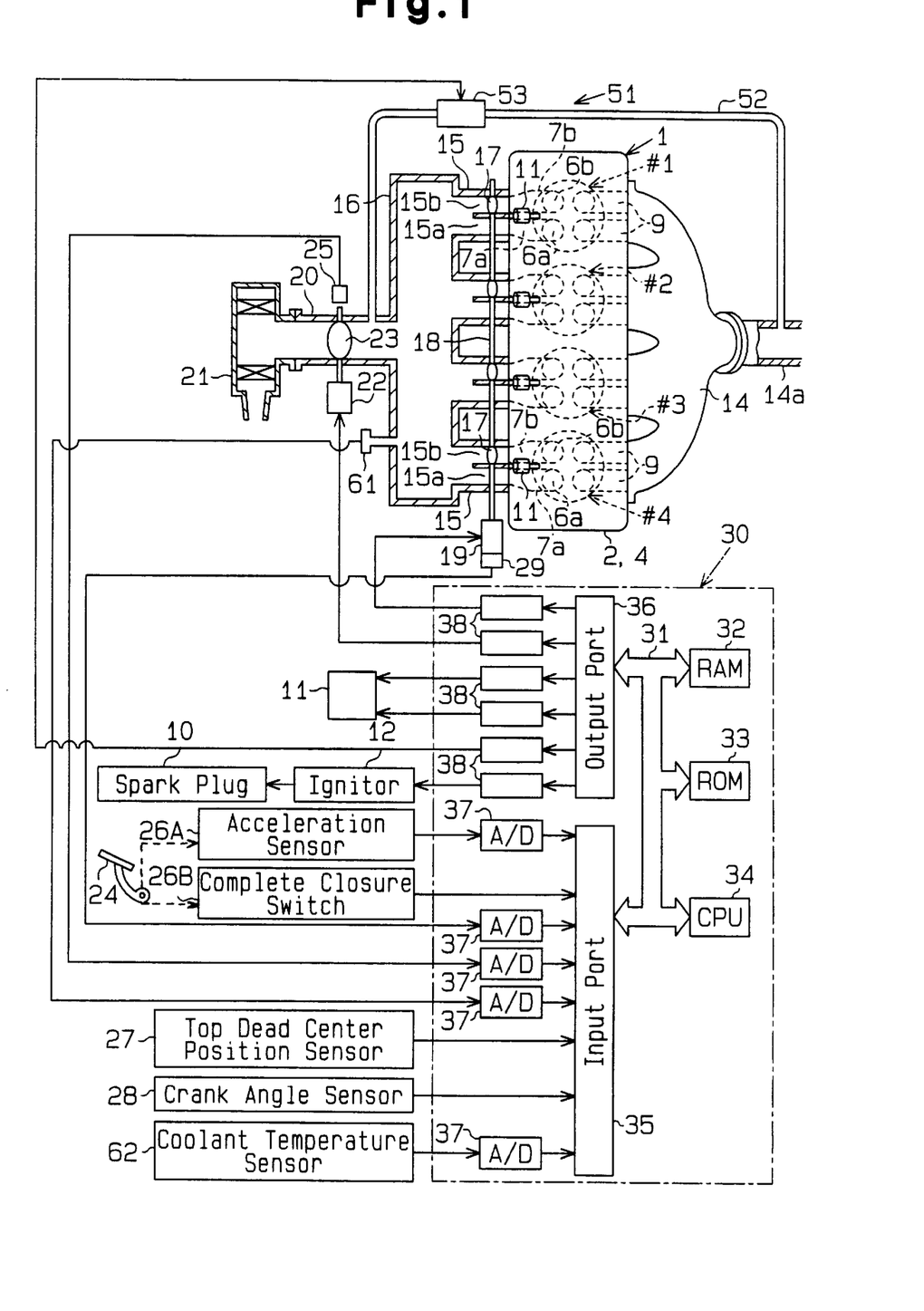
FIG. 1 is a schematic view and block diagram showing an engine combustion control apparatus according to the present invention.
Figure 2:
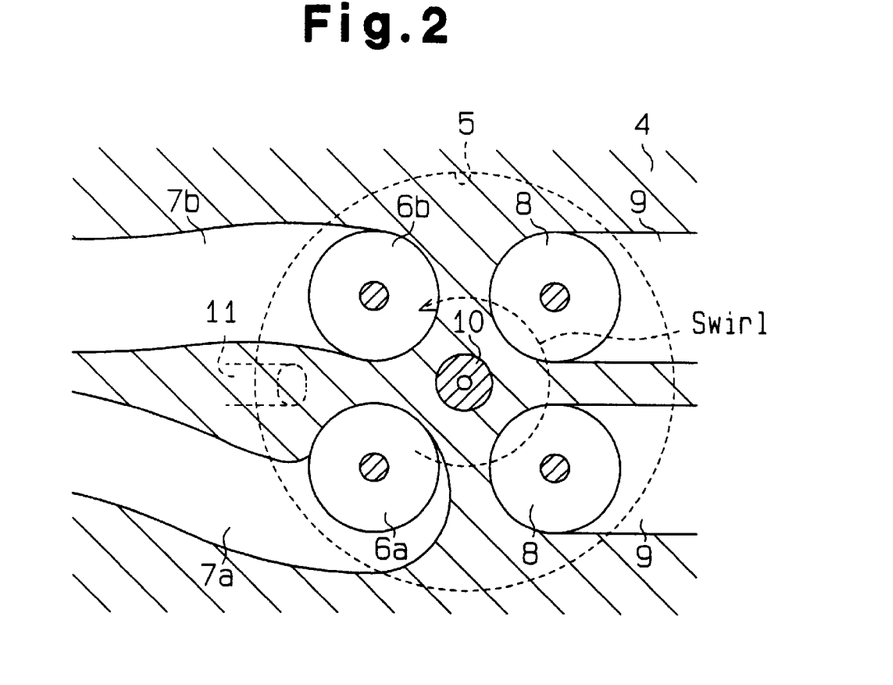
FIG. 2 is an enlarged schematic cross-sectional view showing a cylinder of the engine of FIG. 1.

FIG. 1 is a schematic view showing a combustion control apparatus of an automotive engine that injects fuel directly into its cylinders. An engine 1 has, for example, four cylinders #1, #2, #3, #4. The structure of the combustion chamber of each cylinder #1–#4 is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. Four valves (first intake valve 6a, second intake valve 6b, and two exhaust valves 8) are provided for each cylinder #1–#4. The first intake valve 6a is connected with a first intake port 7a while the second intake valve 6b is connected with a second intake port 7b. Each exhaust valve 8 is connected with an exhaust port 9.

As shown in FIG. 2, the first intake port 7a is a helical port that extends in a helical manner The second intake port 7b extends in a generally straight manner. Spark plugs 10 are arranged at the middle of the cylinder head 4. High voltage is applied to each spark plug 10 by an ignitor 12 through a distributor (not shown). The ignition timing of each spark plug 10 is determined by the output timing of the high voltage sent from the ignitor 12. A fuel injection valve 11 is arranged near the inner wall of the cylinder head at the vicinity of each set of first and second intake valves 6a, 6b. The fuel injection valve 11 is used to inject fuel directly into the associated cylinder #1–#.

As shown in FIG. 1, the first and second intake ports 7a, 7b of each cylinder #1–#4 are connected to a surge tank 16 by a first intake passage 15a and a second intake passage 15b, which are defined in an intake manifold 15. A swirl control valve 17 is arranged in each second intake passage 15b. The swirl control valves 17 are connected to, for example a step motor 19 by a common shaft 18. The step motor 19 is controlled by signals sent from an electronic control unit (ECU) 30. The swirl control valves 17 may be driven by the pressure in the associated first and second intake ports 7a, 7b instead of by the step motor 19.

The surge tank 16 is connected to an air cleaner 21 through an intake duct 20. An electronically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5.

A throttle sensor 25 is arranged in the vicinity of the throttle valve 23 to detect the opening angle (throttle angle) of the valve 23. The exhaust ports 9 of each cylinder #1–#4 are connected to an exhaust manifold 14. After combustion, the exhaust gas is sent to an exhaust duct 14a through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to the exhaust duct 14a. The EGR valve 53 includes a valve seat, a valve body, and a step motor (none of which is shown). The opening area of the EGR valve 53 is altered by causing the step motor to intermittently displace the valve body with respect to the valve seat. When the EGR valve 53 opens, some of the exhaust gas sent into the exhaust duct 14a enters the EGR passage 52. The exhaust gas is then drawn into the intake duct 20 through the EGR valve 53. In other words, some of the exhaust gas is recirculated by the EGR mechanism 51 and returned to the air-fuel mixture. The recirculation amount of the exhaust gas (EGR amount) is adjusted by the opening amount of the EGR valve 53.

The ECU 30 is a digital computer provided with a random access memory (RAM) 32, a read only memory (ROM) 33, a central processing unit (CPU) 34, which is a microprocessor, an input port 35, and an output port 36 that are connected to one another by a bidirectional bus 31.

An acceleration pedal 24, which operates the throttle valve 23, is connected to an acceleration sensor 26A. The is acceleration sensor 26A generates voltage proportional to the depression degree of the acceleration pedal 24 and detects the acceleration pedal depression degree ACCP. The voltage output by the acceleration sensor 26A is input into the input port 35 by way of an analog to digital (A/D) converter 37. The acceleration pedal 24 is also provided with a complete closure switch 26B to detect when the pedal 24 is not pressed at all. The closure switch 26B outputs a complete closure signal of one when the acceleration pedal 24 is not pressed at all and outputs a complete closure signal of zero when the acceleration pedal 24 is pressed. The output voltage of the closure switch 26B is also input to the input port 35.

A top dead center position sensor 27 generates an output pulse when, for example, the piston in cylinder #1 reaches the top dead center position during the intake stroke. The output pulse is input to the input port 35. A crank angle sensor 28 generates an output pulse, which is input to the input port 35, each time a crankshaft of the engine 1 is rotated by a crank angle CA of 30 degrees. The CPU 34 reads the output pulses sent from the top dead center position sensor 27 and the crank angle sensor 28 to compute the engine speed NE.

The rotational angle of the shaft 16 is detected by a swirl control valve sensor 29 to measure the opening angle of the swirl control valves 17. The signal output of the swirl control valve sensor 29 is input to the input port 35 by way of an A/D converter 37.

The throttle sensor 25 detects the throttle angle. The signal output of the throttle sensor 25 is input to the input port 35 by way of an A/D converter 37.

An intake pressure sensor 61 is provided to detect the pressure in the surge tank 16 (intake pressure PM). A coolant temperature sensor 62 is provided in the engine 1 to detect the temperature of the engine coolant (coolant temperature). The signal outputs of the sensors 61, 62 are input to the input port 35 by way of A/D converters 37.

The output port 36 is connected to the fuel injection valves 11, the step motors 19, 22, the ignitor 12, and the step motor of the EGR valve 53 by way of drive circuits 38. The ECU 30 controls the fuel injection valves 11, the step motors 19, 22, the ignitor 12, and the EGR valve 53 with control programs stored in the ROM 33 based on signals sent from the sensors 25–29 and 61–62.

Figure 3:
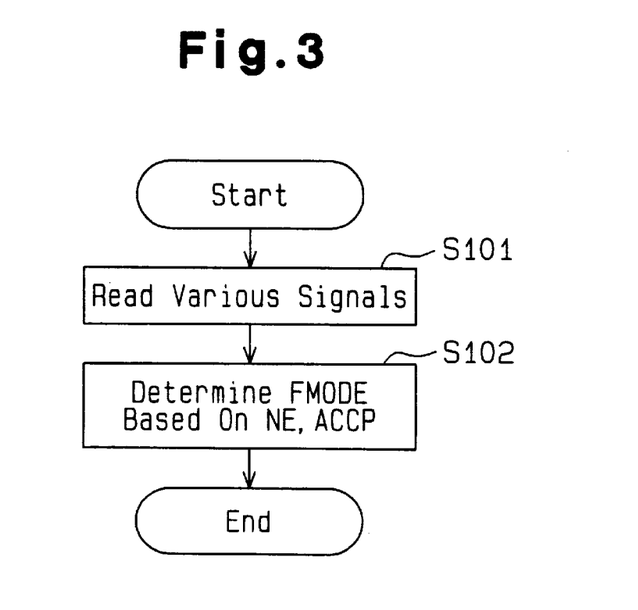
FIG. 3 is a flowchart showing a routine for determining the combustion mode.

Control routines executed by the combustion control apparatus will now be described with reference to FIGS. 3 to A routine for determining the combustion mode is illustrated in FIG. 3. The ECU 30 executes this routine in an interrupting manner once for every predetermined crank angle. When entering this routine, at step S101, the ECU 30 reads the various signals that indicate the acceleration pedal depression degree ACCP, the engine speed NE, and other conditions, which are sent from the sensors 25–29 and 61–62. The ECU 30 then proceeds to step S102 and obtains the engine load of the engine 1 based on the acceleration pedal depression degree ACCP and the engine speed NE. With reference to the engine load, the ECU 30 then determines the. preferable combustion mode in the present state and sets the combustion mode FMODE accordingly. The combustion mode FMODE is selected from the modes of stratified charge combustion, lean homogeneous charge combustion, and stoichiometric homogeneous charge combustion.

When combustion mode FMODE is zero, stoichiometric homogeneous charge combustion is indicated. Stoichiometric homogeneous charge combustion is performed when the load applied to the engine 1 is in a high range. When combustion mode FMODE is one, stratified charge combustion is indicated. Stratified charge combustion is performed when the load applied to the engine is in a low range. When combustion mode FMODE is two, lean homogeneous charge combustion is indicated. Lean homogeneous charge combustion is performed when the load applied to the engine 1 is in an intermediate range. The ECU 30 controls the fuel injection valves 11, the swirl control valves 17, and other parts in accordance with the selected combustion mode When stratified charge combustion is performed, the fuel injection valve 11 injects fuel at the final stage of each combustion stroke When lean homogeneous charge combustion or stoichiometric homogeneous charge combustion is performed, the fuel injection valve 11 injects fuel during the intake stroke of the associated piston.

The load applied to the engine 1 is represented by the basic fuel injection amount $Q_{f0}$, which is obtained from the engine speed NE and the acceleration pedal depression degree ACCP. The value of the basic fuel injection amount $Q_{f0}$ at which the combustion mode is shifted between stratified charge combustion and lean homogeneous charge combustion is represented as $Q_0$ in FIG. 9. The actual amount of fuel injected from the fuel injection valve 11, or the actual fuel injection amount $Q_f$, is theoretically equal to the basic fuel injection amount $Q_{f0}$ when shifting the combustion mode between stratified charge and lean homogeneous charge. Thus, when shifting modes, the actual fuel injection amount $Q_f$ is theoretically equal to the basic fuel injection amount $Q_{f0}$.

Figure 4:
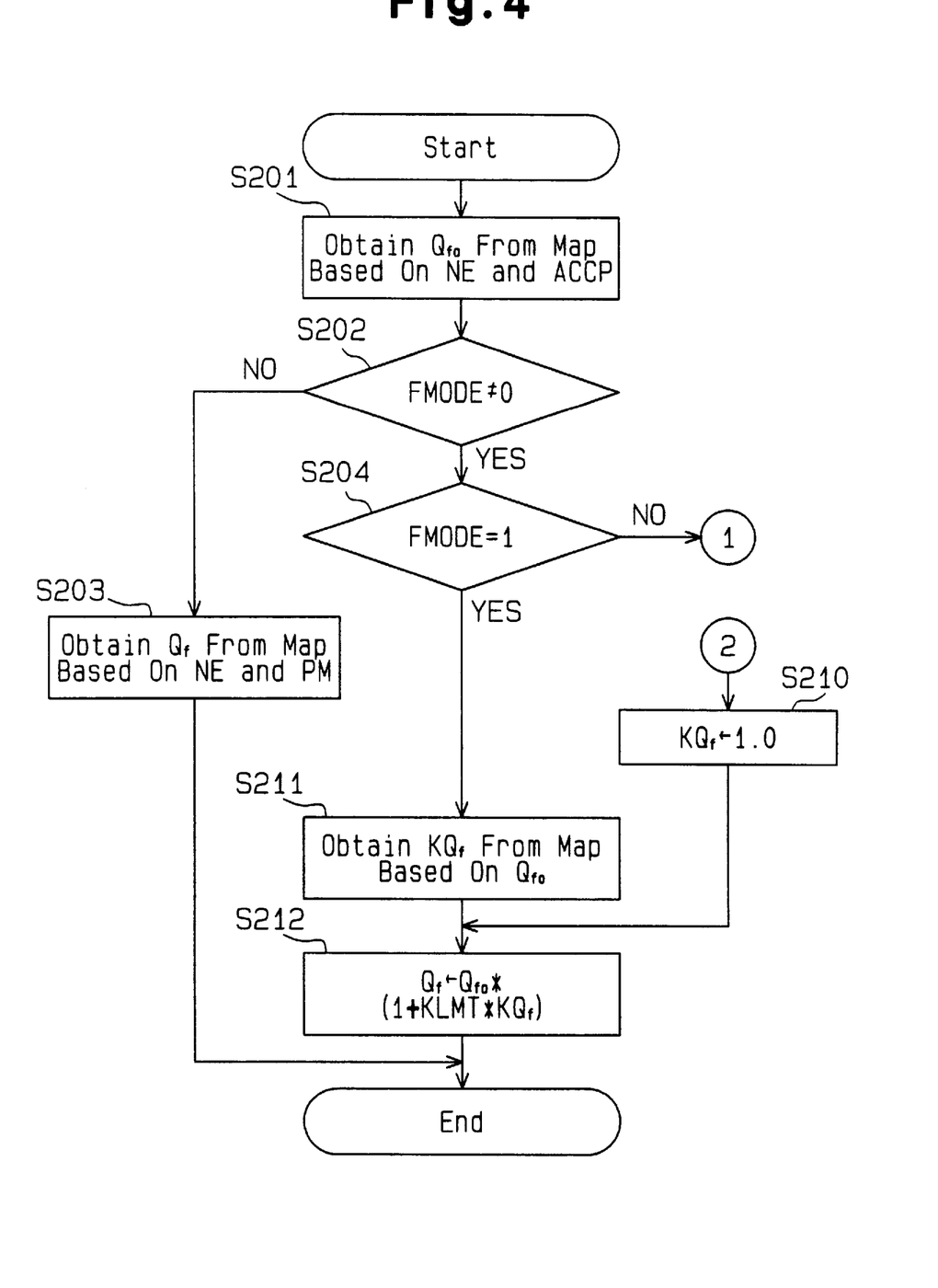
FIG. 4 is a flowchart showing a routine for computing the fuel injection amount.
Figure 5:
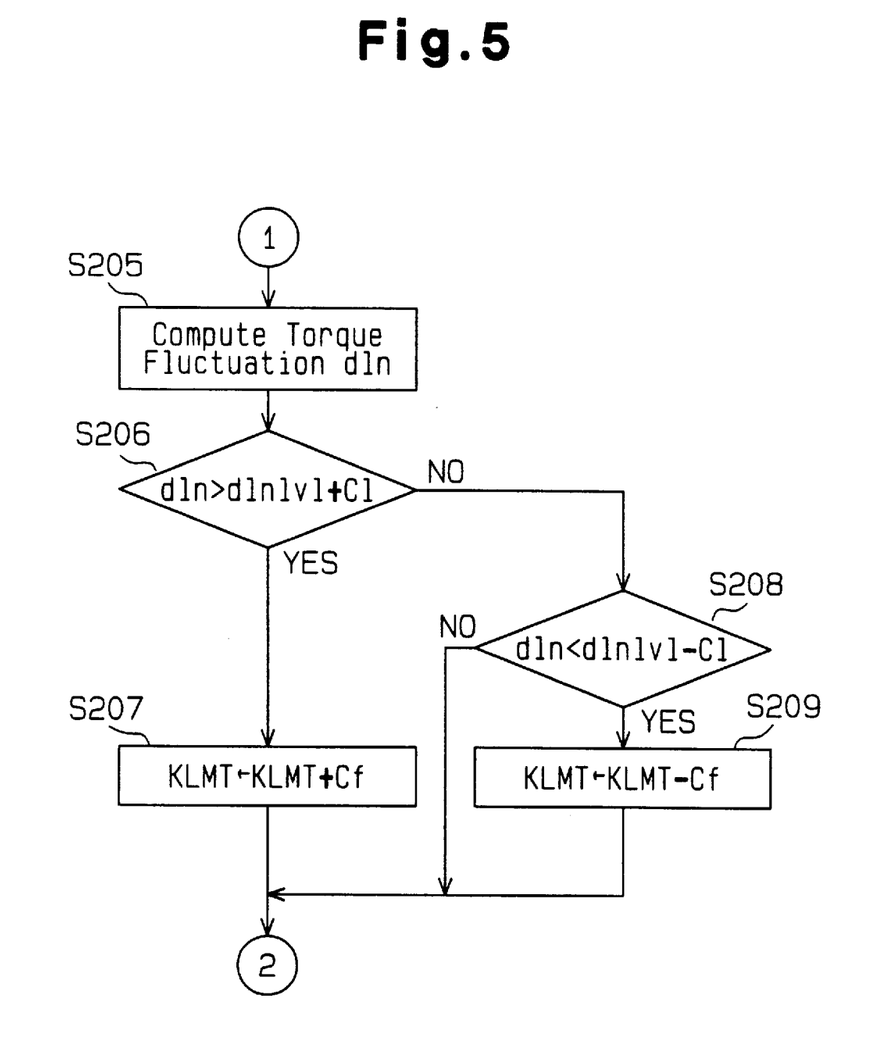
FIG. 5 is a flowchart showing a continuation of the routine for computing the fuel injection amount.

A routine for computing the fuel injection amount will now be described with reference to FIGS. 4 and 5. The ECU 30 executes this routine in an interrupting manner once for every predetermined crank angle.

When entering the routine, at stop S201, the ECU 30 obtains the basic fuel injection amount $Q_{f0}$ from the engine speed NE and the acceleration pedal depression degree ACCP by referring to a basic fuel injection amount map (not shown).

At step S202, the ECU 30 judges whether or not the combustion mode FMODE indicates zero. If the FMODE indicates zero, stoichiometric homogeneous charge combustion is being performed. In this case, the ECU 30 proceeds to step S203 At step S203, the ECU 30 obtains the actual fuel injection amount $Q_f$ from the engine speed NE and the intake pressure PM by referring to a stoichiometric homogeneous charge combustion map.

When it is determined that the combustion mode FMODE indicates a value other than zero in step S202, the ECU 30 proceeds to step S204 and judges whether or not the combustion mode FMODE indicates one. If the combustion mode does not indicate one, lean homogeneous charge combustion is being performed. In this case, the ECU 30 proceeds to step S205 (FIG. 5). If the combustion mode indicates one in step S204, stratified charge combustion is being performed. In this case, the ECU 30 proceeds to step S211. Step 205 and those subsequent to step S205 are carried out to compute the fuel injection amount during lean homogeneous charge combustion. Step 211 and those subsequent to step 211 are carried out to compute the fuel injection amount during stratified charge combustion.

At step S205, the ECU computes the torque fluctuation dln of the engine 1 based on the output pulses sent from the top dead center position 27 and the crank angle sensor 28. The torque fluctuation dln is the average value of the torque fluctuations dln1, dln2, dln3, dln4 produced by cylinders #1, #2, #3, #4, respectively. The torque fluctuation dln is computed from the following equation (1):

$$dln=(dln1+dln2+dln3+dln4)/4 \quad (1)$$

The torque T produced in each cylinder #1–#4 for each combustion satisfies the following equation (2):

$$T \propto (30°/t_b)^2 - (30°/t_a)^2 \quad (2)$$

Figure 6:
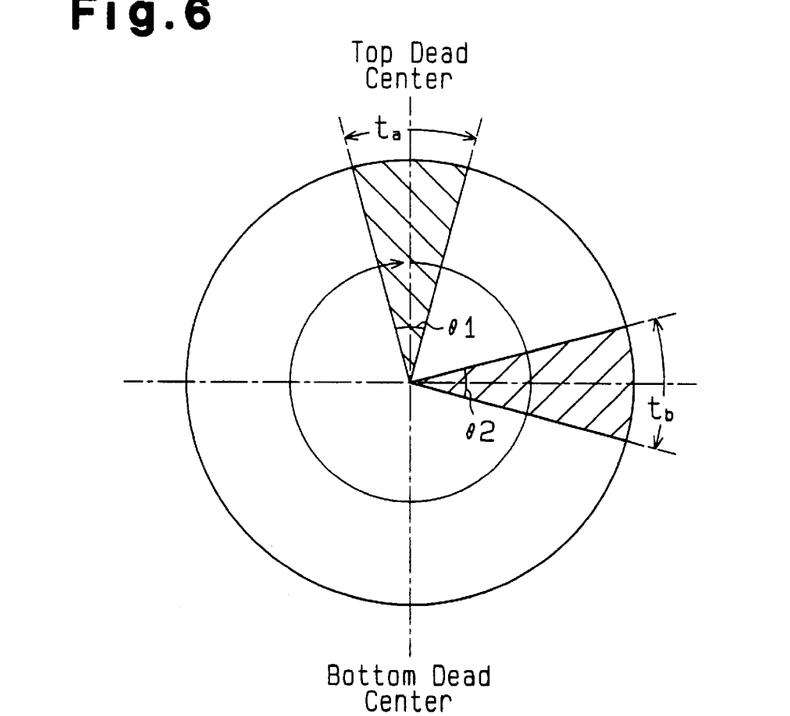
FIG. 6 is an explanatory drawing illustrating how the torque fluctuation is determined.

In the equation, $t_a$ represents the time required for the crankshaft of the engine 1 to rotate through a predetermined crank angle range θ1, which includes the crank angle corresponding to the top dead center position of the piston in cylinder #1 (FIG. 6). Furthermore, $t_b$ represents the time required for the crankshaft of the engine 1 to rotate through a predetermined crank angle range θ2, which is advanced by 90 degrees from the crank angle corresponding to the top dead center position of the piston in cylinder #1. The crank angle range θ1 and the crank angle range θ2 each extend over an angular range of, for example, 30 degrees.

The torque fluctuation dln1 of cylinder #1 is computed from the differences of the torque T produced during each combustion. The torque fluctuation dln1 in cylinder #1 is represented by the following equation (3):

$$dln1=[(30°/t_{bi})^2-(30°/t_{ai})^2]-[(30°/t_{bi-1})^2-(30°/t_{ai-1})^2] \quad (3)$$

The torque fluctuations in dln2, dln3, dln4 of the respective cylinders #2, #3, #4 are computed in the same manner as the torque fluctuation dln1 of cylinder #1. Based on the torque fluctuations dln1–dln4 of the respective cylinders #1–#4, the ECU 30 computes the torque fluctuation dln of the engine 1 using the above equation (1).

Figure 7:
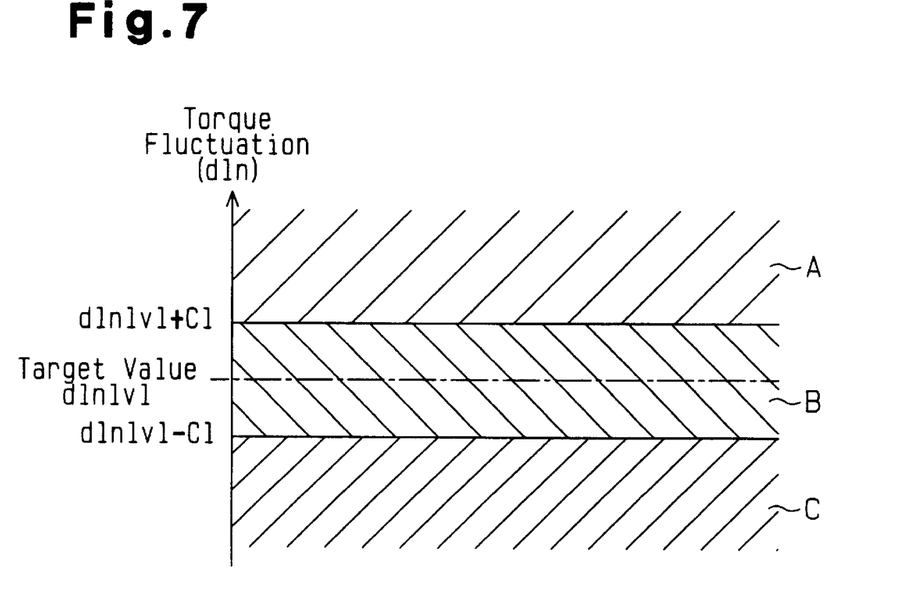
FIG. 7 is a graph showing the ranges of torque fluctuation.

After computing the torque fluctuation dln in step S205, the ECU 30 proceeds to step S206 and judges whether the torque fluctuation dln is greater than the sum of a target value dlnlvl and a predetermined value Cl (dlnlvl+Cl). If it is determined that the torque fluctuation dln is greater than the sum of the target value dlnlvl and the predetermined value Cl, the torque fluctuation dln is included in range A, as shown in FIG. 7. In this case, the ECU 30 proceeds to step S207. At step S207, the ECU 30 adds a predetermined value Cf to a lean homogeneous charge combustion coefficient KLMT that was used during the previous fuel injection amount correction. The ECU 30 then renews the lean homogeneous charge combustion coefficient KLMT with the sum (KLMT+Cf). Afterwards, the ECU 30 proceeds to step S210.

In step S206, if it is determined that the torque fluctuation dln is not greater than the difference between the target value dlnlvl and the predetermined value Cl, the ECU 30 proceeds to step S208. At step S208, the ECU 30 judges whether the torque fluctuation dln is smaller than the difference between the target value dlnlvl and the predetermined value Cl (dlnlvl-Cl). If it is determined that the torque fluctuation dln is smaller than the difference between the target value dlnlvl and the predetermined value Cl, the torque fluctuation dln is included in range C, as shown in FIG. 7. In this case, the ECU 30 proceeds to step S209. At step S209, the ECU 30 subtracts the predetermined value Cf from the lean homogeneous charge combustion coefficient KLMT that was used during the previous fuel injection amount correction. The ECU 30 then renews the lean homogeneous charge combustion coefficient KLMT with the difference (KLMT-Cf). Afterwards, the ECU 30 proceeds to step S210.

In step 208, is it is determined that the torque fluctuation dln is not smaller than the difference between the target value dlnlvl and the predetermined value Cl, the torque fluctuation dln is included in range B, as shown in FIG. 7. In this case, the ECU 30 proceeds directly to step S210 without renewing the lean homogeneous charge combustion coefficient KLMT.

At step 210 (FIG. 4), the ECU 30 sets a stratified charge combustion coefficient $KQ_f$ to 1.0. The ECU 30 then proceeds to step S212 and computes the actual fuel injection amount $Q_f$ from the following equation (4):

$$Q_f = Q_{f0}(1+KLMT*KQ_f) \quad (4)$$

When the torque fluctuation dln of the engine 1 is included in range A, as shown in FIG. 7, the lean homogeneous charge combustion coefficient KLMT is increased in step S207. This makes the combustion coefficient KLST greater than zero. Thus, the actual fuel injection amount $Q_f$ becomes greater than the basic fuel injection amount $Q_{f0}$ according to equation (4). Accordingly, the relationship between the actual fuel injection amount $Q_f$ with respect to the basic fuel injection amount $Q_{f0}$ shifts from the state shown by solid line L1 in FIG. 9 to the state shown by dotted line L2. The air fuel ratio of the mixture during lean homogeneous charge combustion is greater than the stoichiometric ratio. Therefore, the setting of the actual fuel injection amount $Q_f$ to a value greater than the basic fuel injection amount $Q_{f0}$ decreases the torque fluctuation dln. This minimizes the difference between the torque fluctuation dln and the target value dlnlvl.

When the torque fluctuation dln of the engine 1 is included in range C, as shown in FIG. 7, the lean homogeneous charge combustion coefficient KLMT is decreased in step S209 This reduces the combustion coefficient KLKT to a value less than zero. Thus, the actual fuel injection amount $Q_f$ becomes smaller than the basic fuel injection amount $Q_{f0}$. Accordingly, the relationship between the actual fuel injection amount $Q_f$ with respect to the basic fuel injection amount $Q_{f0}$ shifts from the state shown by solid line L1 in FIG. 9 to the state shown by dotted line L3. The air fuel ratio of the mixture during lean homogeneous charge combustion is greater than the stoichiometric ratio. Therefore, by setting the actual fuel injection amount $Q_f$ to a value smaller than the basic fuel injection amount $Q_{f0}$, the torque fluctuation dln is increased. This minimizes the difference between the torque fluctuation dln and the target value dlnlvl. Therefore, during lean homogeneous charge combustion, the fuel supply, or injection amount $Q_f$, is adjusted to cause the torque fluctuation dln to approach a target value.

Figure 8:
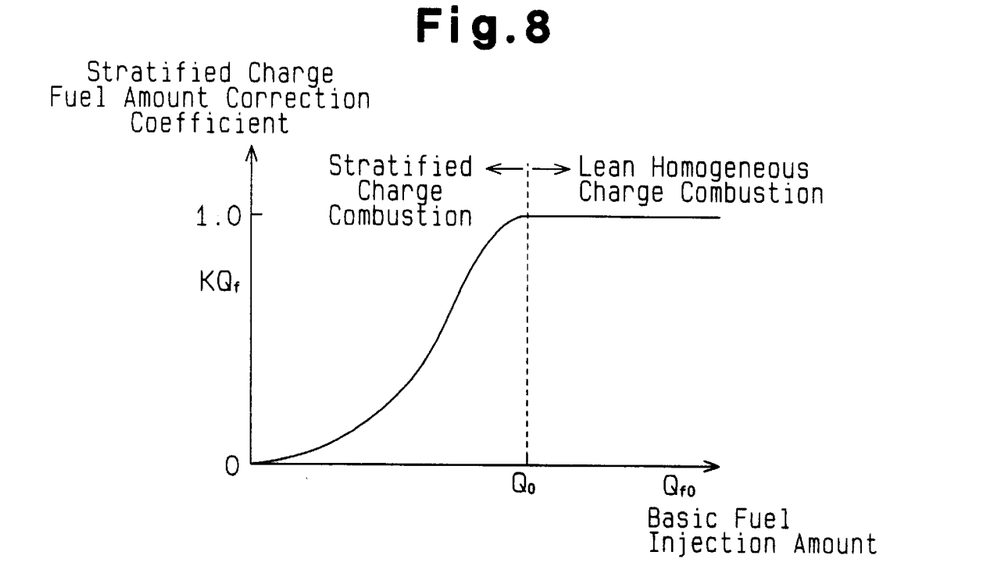
FIG. 8 is a graph of a map used to obtain the fuel amount correction coefficient for stratified charge combustion.

In step S204, if the combustion mode indicates one, stratified charge combustion is being performed. In this case, the ECU 30 proceeds to step S211. The steps subsequent to step S211 are carried out to compute the fuel injection amount during stratified charge combustion. At step S211, the ECU 30 obtains the stratified charge fuel amount correction coefficient $KQ_f$ corresponding to the basic fuel injection amount $Q_{f0}$ by referring to a stratified charge fuel amount correction coefficient map illustrated in FIG. 8.

The ECU 30 then proceeds to step S212 and computes the actual fuel injection amount $Q_f$ from the above equation (4). In this state, the lean homogeneous charge combustion coefficient KLMT has a value that was set immediately before shifting to stratified charge combustion from lean homogeneous combustion. Thus, the lean homogeneous charge combustion coefficient KLMT may be less than zero (KLMT<0) or greater than zero (KLMT>0).

Figure 9:
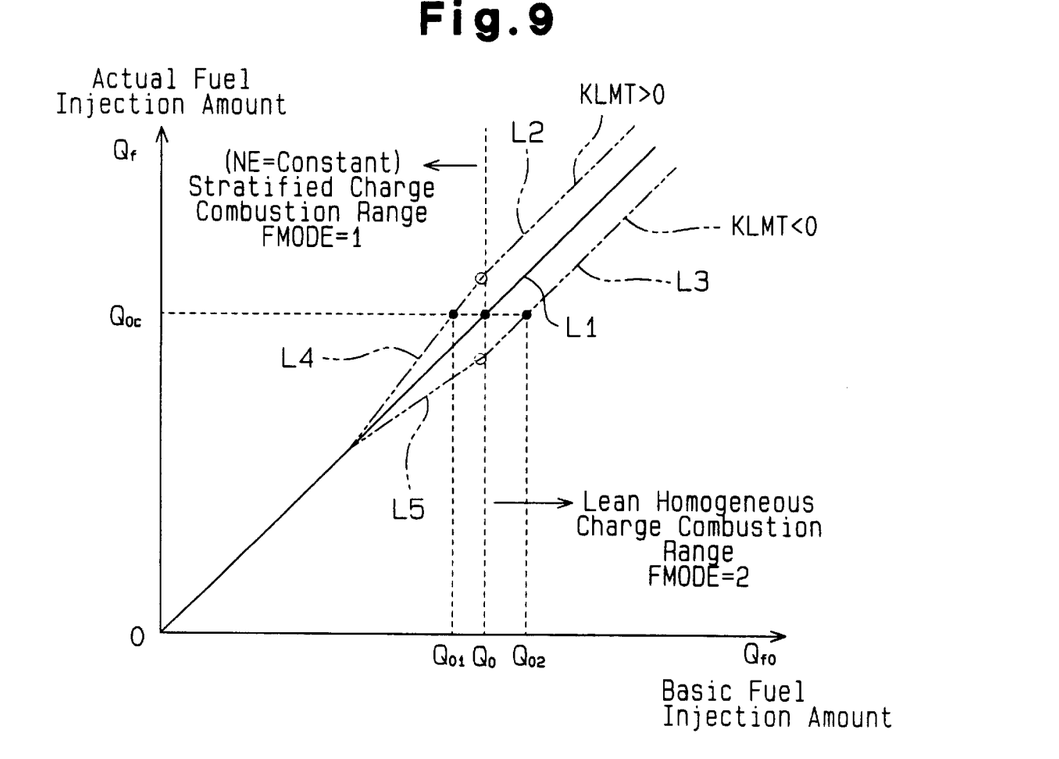
FIG. 9 is a graph showing the relationship between the basic fuel injection amount and the actual fuel injection amount.

If the lean homogeneous charge combustion coefficient KLMT is greater than zero, the actual fuel injection amount $Q_f$ corresponding to the basic fuel injection amount value $Q_0$ is increased, as shown by a small circle on dotted line L4 in FIG. 9. The lean homogeneous charge combustion coefficient KLMT causes the actual fuel injection amount $Q_f$ to vary as shown by dotted line L4. Accordingly, the actual fuel injection amount $Q_f$ varies continuously as shown by dotted lines L4, L2 when the combustion mode is shifted between stratified charge combustion and lean homogeneous combustion. This prevents sudden changes of the engine torque.

Furthermore, when the actual fuel injection amount $Q_f$ varies with respect to the basic fuel injection amount $Q_{f0}$ as shown by dotted lines L4, L2, the combustion mode is shifted between stratified charge combustion and lean homogeneous charge combustion when the basic fuel injection amount $Q_{f0}$ reaches value $Q_{0I}$, which is slightly smaller than value $Q_0$. This guarantees the necessary actual fuel injection amount $Q_f$ (the amount represented by $Q_{0c}$) when shifting combustion modes.

If the lean homogeneous charge combustion coefficient KLWR is less than zero, the actual fuel injection amount $Q_f$ corresponding to the basic fuel injection amount value $Q_0$ is decreased, as shown by the small circle on dotted line L5 in FIG. 9. The lean homogeneous charge combustion coefficient KLMT causes the actual fuel injection amount $Q_f$ to shift as shown by dotted line L5. Accordingly, the actual fuel injection amount $Q_f$ varies continuously as shown by dotted lines L5, L3 when the combustion mode is shifted between stratified charge combustion and lean homogeneous combustion. This prevents sudden changes of the engine torque.

Furthermore, when the actual fuel injection amount $Q_f$ varies with respect to the basic fuel injection amount $Q_{f0}$ as shown by dotted lines L5, L3, the combustion mode is shifted between stratified charge combustion and lean homogeneous combustion when the basic fuel injection amount $Q_{f0}$ reaches value $Q_{oz}$, which is slightly greater than value $Q_O$. This guarantees the necessary actual fuel injection amount $Q_f$ (the amount represented by value $Q_{0c}$) when shifting combustion modes.

The increasing (correction) of the basic fuel injection amount $Q_{f0}$ during lean homogeneous charge combustion shifts the actual fuel injection amount $Q_f$, as shown by dotted line L2 in FIG. 9. The increasing (correction) of the basic fuel injection amount $Q_{f0}$ during stratified charge combustion shifts the actual fuel injection amount $Q_f$, as shown by dotted line L4 in FIG. 9. The decreasing (correction) of the basic fuel injection amount $Q_{f0}$ during lean homogeneous charge combustion shifts the actual fuel injection amount $Q_f$, as shown by dotted line L3 in FIG. 9. The decreasing (correction) of the basic fuel injection amount $Q_{f0}$ during stratified charge combustion shifts the actual fuel injection amount $Q_f$, as shown by dotted line L5 in FIG. 9. Accordingly, the fuel injection amount during lean homogenous combustion and during stratified charge combustion is corrected so that the actual fuel injection amount $Q_f$ varies in a continuous manner during shifting of the combustion mode. This eliminates sudden changes in the actual fuel injection amount $Q_f$ when shifting combustion modes and thus prevents shocks caused by sudden changes in the engine torque, thus improving the performance of the engine 1.

The lean homogeneous charge,combustion coefficient KLMT used during lean homogeneous charge combustion is used to correct the basic fuel injection amount $Q_{f0}$ and obtain the actual fuel injection amount $Q_f$. Thus, the fuel injection amount, when shifting between lean homogeneous charge combustion and stratified charge combustion, is biased in a continuous manner. This varies the actual fuel injection amount $Q_f$ in a gradual manner.

It should be apparent to those skilled in the art that the present invention may be embodied in many other specific forms without departing from the spirit or scope of the invention. Particularly, it should be understood that the invention may be embodied in the following forms.

(1) In the preferred and illustrated embodiment, the torque fluctuation dln is employed to represent the engine torque fluctuation. However, the air fuel ratio, which changes in accordance with the engine torque fluctuation, may be used instead to represent the engine torque fluctuation.

(2) Instead of detecting the torque fluctuation din, a pressure sensor may be arranged in each combustion chamber 5 to detect when the pressure in the associated cylinder becomes maximum. This is because variations of the cylinder pressure correspond with the-engine torque fluctuation.

(3) Instead of detecting the torque fluctuation din, a pressure sensor may be arranged in each combustion chamber 5 to detect when the combustion pressure in the associated cylinder becomes maximum. This is because variations of the combustion pressure correspond with the engine torque fluctuation.

(4) Instead of detecting the torque fluctuation din, the rotating speed of the crankshaft may be detected. This is because variations in the rotating speed of the crankshaft correspond with the engine torque fluctuation.

Therefore, the present examples and embodiments are to be considered as illustrative and not restrictive and the invention is not to be limited to the details given herein, but may be modified within the scope and equivalence of the appended claims.

What is claimed is:

1. An internal combustion engine having a cylinder, wherein the engine selectively operates in a stratified charge combustion mode and a lean homogeneous charge combustion mode to burn fuel in the cylinder, the engine comprising:

a fuel supply device for supplying the fuel into the cylinder;

an output fluctuation detector for detecting fluctuations in the output rotation of the engine;

determining means for determining which combustion mode is being performed;

a controller for establishing a first fuel supply is amount to cause the output fluctuation of the engine to approach a predetermined target value when the determination result indicates lean homogeneous charge combustion and for controlling the fuel supply device in accordance with the first fuel supply amount; and wherein the controller establishes a second fuel supply amount in accordance with the first fuel supply amount when the determination result indicates stratified charge combustion and, wherein the controller controls the fuel supply device in accordance with the second fuel supply amount.

2. The engine according to claim 1, wherein the fuel supply device is a fuel injector for injecting the fuel into the cylinder, and wherein the first and second fuel supply amounts are first and second amounts of fuel injection, respectively.

3. The engine according to claim 1 including an acceleration pedal and a pedal angle detector for detecting the degree of depression of the acceleration pedal.

4. The engine according to claim 1, wherein the engine output fluctuation is torque fluctuation.

5. The engine according to claim 2, wherein the controller establishes the first fuel injection amount by varying a predetermined basic amount of fuel injection.

6. The engine according to claim 5, wherein the controller establishes the second fuel injection amount by increasing the basic amount when the first fuel injection amount is established by increasing the basic amount.

7. The engine according to claim 5, wherein the controller establishes the second fuel injection amount by decreasing the basic amount when the first fuel injection amount is established by decreasing the basic amount.

8. The engine according to claim 5, wherein the second fuel injection amount is calculated by correcting the basic amount of fuel injection with first and second correction coefficients.

9. The engine according to claim 8, wherein the first correction coefficient varies in accordance with the torque fluctuation of the engine and the second correction coefficient varies in accordance with the basic amount.

10. An internal combustion engine having a cylinder, wherein the engine selectively operates in a stratified charge combustion mode and a lean homogeneous charge combustion mode to burn fuel in the cylinder, the engine comprising:

a fuel injector for injecting the fuel into the cylinder;

an output fluctuation detector for detecting fluctuations in the output rotation of the engine;

determining means for determining which combustion mode is being performed;

a controller for establishing a first fuel injection amount to cause the output fluctuation of the engine to approach a predetermined target value when the determination result indicates lean homogeneous charge combustion and for controlling the fuel injector in accordance with the first fuel injection amount, wherein the controller establishes the first fuel injection amount by varying a predetermined basic amount of fuel injection; and wherein the controller establishes a second fuel injection amount in accordance with the first fuel injection amount when the determination result indicates stratified charge combustion, wherein the controller controls the fuel injector in accordance with the second fuel injection amount, and wherein the controller establishes the second fuel injection amount by increasing the basic amount when the first fuel injection amount is established by increasing the basic amount, and wherein the controller establishes the second fuel injection amount by decreasing the basic amount when the first fuel injection is established by decreasing the basic amount.

11. The engine according to claim 10, wherein the second fuel injection amount is calculated by correcting the basic amount with first and second correction coefficients.

12. The engine according to claim 11, wherein the first correction coefficient varies in accordance with the torque fluctuation of the engine and the second correction coefficient varies in accordance with the basic amount of fuel injection.

13. A method for controlling delivery of fuel to a cylinder of an engine by selectively operating the engine in a stratified charge combustion mode and a lean homogeneous charge combustion mode, the method comprising the steps of:

detecting operating conditions of the engine;

selecting a combustion mode in accordance with the detected operating conditions;

establishing and delivering a first fuel supply amount to cause an output fluctuation of the engine to approach a predetermined target value when homogeneous charge combustion is being performed; and establishing and delivering a second fuel supply amount in accordance with the first fuel amount when stratified charge combustion is being performed.

14. The method according to claim 13, wherein the degree of depression of an acceleration pedal and the engine speed are detected during the detecting step.

15. The method according to claim 13, including the step of detecting torque fluctuation of the engine, wherein the torque fluctuation is the output fluctuation.

16. The method according to claim 13, wherein the first fuel supply amount is established by varying a predetermined basic amount of fuel supply.

17. The method according to claim 16, wherein the second fuel supply amount is established by increasing the basic amount when the first fuel supply amount is established by increasing the basic amount.

18. The method according to claim 16, wherein the second fuel supply amount is established by decreasing the basic amount when the first fuel supply amount is established by decreasing the basic amount.

19. The method according to claim 16, wherein the second fuel supply amount is calculated by using correction coefficients when correcting the basic amount.

20. The method according to claim 19, wherein the correction coefficients include first and second correction coefficients, wherein the first correction coefficient varies in accordance with the output fluctuation of the engine and the second correction coefficient varies in accordance with the basic amount.

* * * * *